United States Patent [19]

Standiford

[11] 4,328,074
[45] May 4, 1982

[54] PRODUCTION OF CONCENTRATED ALCOHOL AND DISTILLERY SLOP

[75] Inventor: Ferris C. Standiford, Greenbank, Wash.

[73] Assignee: Resources Conservation Company, Seattle, Wash.

[21] Appl. No.: 206,170

[22] Filed: Nov. 12, 1980

[51] Int. Cl.³ .................... B01D 1/28; B01D 3/16
[52] U.S. Cl. ................... 203/19; 159/24 B; 203/24; 203/26
[58] Field of Search .............. 159/24 B; 203/19, 24, 203/26, 71, 73–75, 77, 78, 80, 81, 82, 84, 91, 93, 94, 98, DIG. 13; 568/913, 916

[56] References Cited

U.S. PATENT DOCUMENTS

| | | |
|---|---|---|
| 1,427,888 | 9/1922 | Winter ............................. 203/19 |
| 1,822,455 | 9/1931 | Ricard . |
| 2,010,929 | 8/1935 | Reich . |
| 2,053,111 | 9/1936 | Reich . |
| 2,126,974 | 8/1938 | Reich . |
| 2,127,138 | 8/1938 | Reich . |
| 2,152,164 | 3/1939 | Wentworth . |
| 2,185,595 | 1/1940 | Kleinschmidt . |
| 2,327,643 | 8/1943 | Houghland . |
| 2,440,173 | 4/1948 | Henszey . |
| 2,577,701 | 12/1951 | Deming et al. . |
| 2,619,814 | 12/1952 | Kniel . |
| 2,912,365 | 11/1959 | Irvine . |
| 3,021,265 | 2/1962 | Sadtler et al. . |
| 3,093,553 | 6/1963 | Ramen . |
| 3,122,487 | 2/1964 | Mroz . |
| 3,416,318 | 12/1968 | Chocquet . |
| 3,433,717 | 3/1969 | Loebel . |
| 3,489,654 | 1/1970 | Geiringer . |
| 3,514,375 | 5/1970 | Dambrine . |
| 3,637,465 | 1/1972 | Wilson . |
| 3,766,020 | 10/1973 | Sieder . |
| 3,846,255 | 11/1974 | Sisk . |
| 4,002,525 | 1/1977 | Baierl . |
| 4,030,985 | 6/1977 | Barba . |
| 4,213,830 | 7/1980 | Koppl . |
| 4,217,178 | 8/1980 | Katzen . |
| 4,234,391 | 11/1980 | Seader . |
| 4,256,541 | 3/1981 | Muller . |

Primary Examiner—Frank Sever
Attorney, Agent, or Firm—Finnegan, Henderson, Farabow, Garrett & Dunner

[57] ABSTRACT

Concentrated alcohol and distillery slop are produced from fermented beer with a reduced amount of energy by employing a vapor recompression distillery slop evaporator in which evaporator vapors are used to strip alcohol from the fermented liquor before they are returned as the heat source for evaporation. Vents in the evaporator permit passage of uncondensed vapors used to drive the evaporator to a rectifier, in which they constitute the principal heat and alcohol source. Condensed vapors from the evaporator and the bottom stream from the rectifier are stripped of their remaining alcohol content in a condensate stripper, which is also driven by the recompressed vapors from the evaporator. This prevents dilution of the slops and the additional energy cost that would be necessary if the water content of these streams had to be removed in the slop evaporator.

7 Claims, 2 Drawing Figures

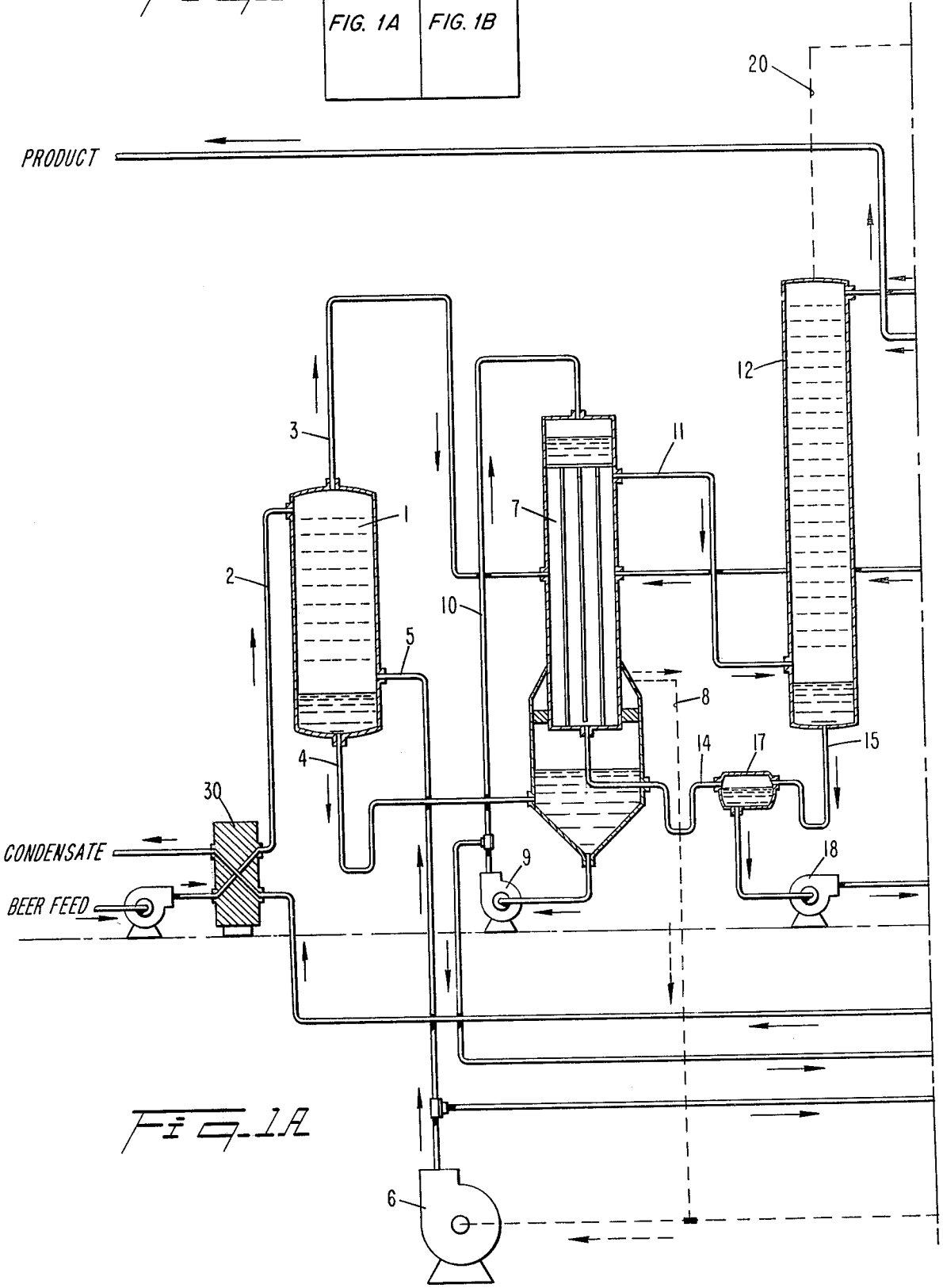

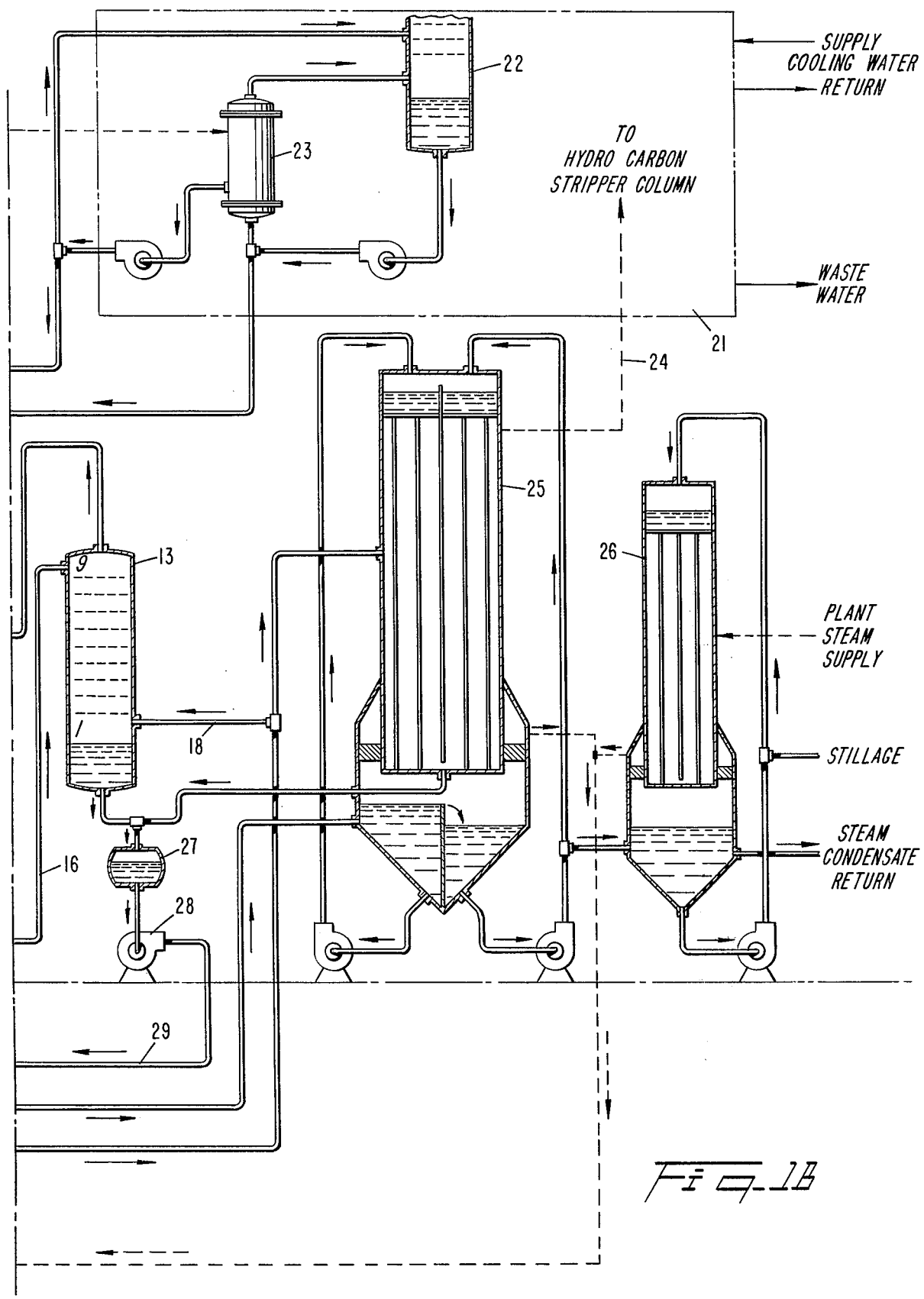

ବ4,328,074

PRODUCTION OF CONCENTRATED ALCOHOL AND DISTILLERY SLOP

BACKGROUND OF THE INVENTION

The present ivention relates to an improved process and system for producing alcohol by fermentation.

In a conventional plant for the production of alcohol by fermentation, the "beer" from the fermenters is sent first to a distillation column or columns. Here the alcohol is stripped from the beer and is concentrated to remove most of the water. The energy for stripping and concentrating the alcohol comes from steam injected at the bottom of the column or columns. The spent beer from the distillation system is called "distillery slop" and has value as an animal feed if much of its water content is removed. Otherwise, its disposal could be a serious problem. Concentrating this slop to produce animal feed consequently has long been an industry practice, usually by use of multiple-effect evaporators.

The energy requirement for producing alcohol with the conventional process and system has been so high that the cost of producing the alcohol has been about the same as its fuel value.

More specifically, the distillation column in the conventional plant has two basic sections, the beer still and the rectifier. The beer still is located below the point of beer addition, and steam is admitted at the bottom to strip out the alcohol. Alcohol losses with the slop can be minimized by increasing steam input or providing more plates or trays in the beer still, but these expedients increase either capital expenditures or operating costs and therefore must be balanced against the increased recovery of alcohol.

Above the beer still is the rectifier section, which serves to separate alcohol from water, with the alcohol leaving at the top and the water, from both the beer and the added steam, leaving as a diluent of the slops at the bottom. The total distillation section may have on the order of 50 plates and use on the order of 20 pounds of steam per gallon of 190 proof alcohol produced. The large number of plates requires such a tall vessel height that the column is frequently split into two sections, one section being the beer still with about 20 plates and the other the rectifier with about 30 plates.

The slop withdrawn from the bottom of the beer still is then concentrated, usually by use of multiple effect evaporators, which requires still more energy. As indicated above, the amount of energy necessary for concentrating the alcohol and distillery slop presently has about the same value as the alcohol that is produced.

SUMMARY OF THE INVENTION

The present invention overcomes the problems and disadvantages of the prior art by producing concentrated alcohol and distillery slop from fermented beer with substantially less energy. This is accomplished by integrating the alcohol distillation and slop concentration in a highly efficient process and system employing a vapor recompression evaporator for slop concentration, by employing evaporator vapors as the stripping steam for removing alcohol from the beer, by using the condensing side of the evaporator heating surfaces as a means of enriching the alcohol, and by using the evaporator vents as the source of alcohol and of heat of bringing the alcohol up to desired concentration.

Additional objects and advantages of the invention will be set forth in part in the description which follows, and in part will be obvious from the description or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the process for producing concentrated alcohol and distillery slop from fermented beer with a reduced amount of energy according to the present invention comprises:

(a) feeding the beer to a beer still;

(b) feeding a portion of a water vapor, derived from step (e) hereinbelow, to the still;

(c) withdrawing an alcohol-rich vapor as the overhead from the still;

(d) withdrawing an alcohol-poor distillery slop as the bottom stream from the still;

(e) passing the slop from the still to an evaporator to concentrate the slop by evaporating water vapor therefrom;

(f) passing the vapor from the overhead of the still to the evaporator into indirect heat exchange contact with the slop to condense a portion of the vapor and form a condensate;

(g) passing the condensate from the evaporator to a condensate stripper and withdrawing an alcohol-rich stream as the overhead from the stripper and an alcohol-poor stream as the bottom stream from the stripper;

(h) feeding a portion of the water vapor derived from step (e) hereinabove to the stripper;

(i) passing the uncondensed vapor from the evaporator to a rectifier and withdrawing concentrated alcohol as the overhead from the rectifier and an alcohol-containing mixture as the bottom stream from the rectifier;

(j) passing the alcohol-containing mixture from the rectifier to the stripper for admixture with the condensate from the evaporator;

(k) passing at least a portion of at least one of the water vapor from the evaporator and the vapor from the still to a compressor to form a compressed vapor, the energy supplied to the compressor constituting a primary source of energy to the process; and (l) withdrawing the concentrated slop from the evaporator.

Preferably, the water vapor from the evaporator is passed to the compressor to form the compressed vapor, which is then used as the source of heat for the beer still and the condensate stripper. It is also preferred to pass the alcohol-rich stream from the stripper to the evaporator for admixture with the vapor from the overhead of the still. It is also preferred, in accordance with the invention, that the evaporator comprise a plurality of stages in which the distillery slop is progressively concentrated.

Further to achieve the foregoing objects and in accordance with the purpose of the invention, as embodied and broadly described herein, the system for producing concentrated alcohol and distillery slop from fermented beer with a reduced amount of energy according to the invention comprises:

(a) a beer still;

(b) means for feeding the beer to the still;

(c) means for feeding a portion of the water vapor withdrawn from evaporator means (f) hereinbelow, to the still;

(d) means for withdrawing an alcohol-rich vapor as the overhead from the still;

(e) means for withdrawing an alcohol-poor distillery slop as the bottom stream from the still;

(f) evaporator means for concentrating the slop by evaporating water vapor therefrom;

(g) means for passing the slop from the still to the evaporator means;

(h) means for passing the vapor from the overhead of the still to the evaporator means into indirect heat exchange contact with the slop to condense a portion of the vapor and form a condensate;

(i) condensate stripper means for separating the condensate into an alcohol-rich overhead stream and an alcohol-poor stream;

(j) means for passing the condensate from the evarporator means to condensate stripper means;

(k) means for feeding a portion of the water vapor withdrawn from the evaporator means to the stripper means;

(l) rectifier means for separating uncondensed vapor from the evaporator means into a concentrated alcohol overhead stream and an alcohol-containing mixture as a bottom stream;

(m) means for passing the uncondensed vapor from the evaporator means to the rectifier means;

(n) means for passing the alcohol-containing mixture from the rectifier means to the stripper means for admixture with the condensate from the evaporator;

(o) compressor means for forming a compressed vapor;

(p) means for passing at least one of the water vapor from the evaporator means and the vapor from the still to the compressor means; and (q) means for withdrawing the concentrated slop from the evaporator means.

Preferably means (p) comprises means for passing the water vapor from the evaporator means to the compressor means upstream of the beer still. It is also preferred to include means for passing the alcohol-rich stream from the condensate stripper means to the evaporator for admixture with the vapor from the overhead from the still. It is also preferred that the evaporator means comprise a plurality of stages including means for passing concentrated slop from the first stage to subsequent stages for further concentration.

The accompanying drawings, which are incorporated in and constitute a part of this specificaton, illustrate one embodiment of the ivention and, together with the description, serve to explain the principles of the invention.

BRIEF DESCRIPTION OF THE DRAWINGS

FIGS. 1A and 1B, taken together, are a diagrammatic general arrangement and process flow sheet of one embodiment in accordance with the present invention.

DESCRIPTION OF THE PREFERRED EMBODIMENT

Reference will now be made in detail to the presently preferred embodiment of the invention, an example of which is illustrated in the accompanying drawings.

The preferred embodiment of the system for producing concentrated alcohol and distillery slop from fermented beer with a reduced amount of energy according to the present invention is illustrated in the drawings. "Fermented Beer" can include, for example, ethanol-water mixtures. Beer is fed to beer still 1 through line 2 to form an alcohol-rich vapor withdrawn as overhead stream 3 and an alcohol-poor distillery slop withdrawn as bottom stream 4. The driving force for the separation in the beer still, as embodied herein, is compressed vapor supplied through line 5. In accordance with the invention, the compressor means for forming the compressed vapor is compressor 6. Alternatively, the compressor means may be located in line 3 downstream of beer still 1 instead of or in addition to the compressor means shown in the drawing. Furthermore, a plurality of compressors may be employed, as described below.

In accordance with the invention, both the overhead and bottom streams from the beer still are passed to an evaporator means. As embodied herein, the evaporator means in accordance with the invention is falling film evaporator 7. Other types of evaporators, however, may be employed. The distillery slop from the bottom of the still is concentrated in the evaporator by withdrawing water vapor from the slop in the evaporator through line 8. The vapor from the overhead of the still is passed into indirect heat exchange contact with the slop in the evaporator through line 3 to condense a portion of the vapor and form a condensate while vaporizing the volatile constituents in the slop. The slop is recirculated through the evaporator heating element by means of pump 9 and line 10.

In accordance with the invention, a portion of the vapor separated from the slop is passed through lines 8 and 5 to the beer still to provide the heat for stripping the alcohol from the beer. The vapor is preferably first compressed in compressor 6. As is apparent from the description above, the vapor from the top of the beer still, carrying with it the recovered alcohol, then serves as the heating medium for the slop evaporator. Since the heat in this vapor is used, there is no penalty in having a much higher stripping steam flow through the beer still, in the form of compressed vapor, than can be justified in the conventional process. Consequently, the beer still may have far fewer plates than usual while recovering more alcohol from the beer and losing less alcohol in the slops.

Moreover, as the alcohol-laden vapor condenses in the heating element of the evaporator, the water condenses preferentially, leaving a vapor stream enriched in alcohol. This enriched stream is then vented through line 11 to the base of a rectifier means. As embodied herein, the rectifier means is rectifier 12. The heat from the uncondensed vapor entering the rectifier serves as the driving force for separation of the alcohol in the vapor from the remaining water.

Water from the reflux in the rectifier plus the water condensed in the heating element of the evaporator contains appreciable amounts of alcohol. This alcohol is recovered and recycled, in accordance with the invention, by stripping with vapor from the evaporator, in the same manner as in the beer still, by passage through condensate stripper means. As embodied herein, the condensate stripper means is condensate stripper 13, to which the water is passed through lines 14, 15, and 16, preferably by use of condensate tank 17 and transfer pump 18. A portion of the vapor from the evaporator, preferably after passing through compressor 6, is passed to the stripper through line 19 to provide the heat for the stripper. In the condensate stripper also, alcohol losses are minimized because there is no economic penalty in using as much of the vapor from the evaporator as desired for stripping. The alcohol-rich stream withdrawn as the overhead from the stripper is passed either directly to the rectifier, or preferably to the evaporator for admixture with the vapor from the overhead of the still and transfer of its heat to the slop. Passing the overhead from the stripper to the evaporator is far more efficient. An advantage of operating according to either alternative as contrasted with the conventional process is that the "steam" used in the stripping and rectifying operation leaves as water from the bottom stream of the condensate stripper instead of appearing as a diluent of the slops, which would then have to be removed in the slop evaporator at additional energy cost.

In another embodiment, the rectifier and condensate stripper can constitute a single unit otherwise operating in a identical manner to the separate rectifier and stripper. Thus, the "withdrawal" of the bottom stream from the rectifier in this embodiment is internal at the junction between the rectifier and the stripper, and the passage of the condensate from the evaporator to the stripper would occur at the same junction.

The overhead stream 20 from rectifier 12, after reflux, is alcohol of about 190 proof. In the preferred embodiment, the overhead vapor from the rectifier is further distilled to produce 199+ proof ethanol in an azeotropic dehydration system 21. A hydrocarbon solvent may be added to break the azeotrope of ethanol and water. This solvent is then recovered from the water along with remaining trace amounts of ethanol in a hydrocarbon stripper (not illustrated), which can be a small distillation column. The energy required to operate the dehydration column 22 can be supplied by condensing the overhead vapor from the rectifier column in the dehydration column bottoms reboiler 23. The reflux ratio in the rectifier column can be chosen so that required heat can be supplied to the dehydration column. Vent stream from a slops concentrator evaporator, such as conveyed by line 24, can supply the additional energy required to operate the hydrocarbon stripper.

Trim makeup steam may be provided to offset part of the heat lost in providing reflux in the rectifier column. The primary source of energy to the system, however, is provided by compressor 6. The trim makeup steam is the functional equivalent of the steam added at the base of the beer still in the conventional process, but in the present invention is only about 25% of the amount required in the conventional process. The trim steam may be added at any convenient location, but is preferably added as described below.

In accordance with the invention, the evaporator may constitute a single stage from which the concentrated slop is withdrawn as a product. Since highly efficient recovery of alcohol from the slops and the condensate usually required considerably less stripping steam than the total amount of water that must be evaporated to concentrate the slops, however, only a part of the slop concentration duty need be integrated into the distillation cycle. It is therefore preferred that the evaporator comprise a plurality of stages, the concentrated slop withdrawn from the first stage being passed to subsequent stages for further concentration. Each stage may have its own compressor for recompressing the vapor from the evaporator, or a single compressor may be employed as shown in the drawings. The vapor may be recirculated directly to the evaporators or a part of the vapor may go through the strippers and then be returned to all or any number of the evaporators.

As embodied herein, the stillage from the beer still is fed to a filter or centrifuge (not illustrated) for suspended solids removal and then slightly concentrated in preconcentrator evaporator 7. The remainder of the slops concentration is completed to the finished density in two additional evaporator stages: a two-stage falling-film evaporator 25 and a final slops concentrator 26. Energy to operate the two-stage evaporator is supplied by a portion of the compressed vapor or steam from the compressor 6. Plant steam, i.e. outside steam, is used to drive the final concentrator and is the preferred source of the trim steam. This achieves two benefits: (1) the plant steam provides a larger driving force ($\Delta T$) to reduce heat transfer area requirements and (2) the steam condensate can be returned to boilers without contamination.

Various other desirable features may be added to the system. For example, recovery heat exchangers between the beer still feed and either hot condensate leaving the system or rectifier overhead vapors, or both, may be used to preheat the beer. As embodied herein, the bottom stream from the condensate stripper and the condensate from the second evaporator 25 are combined in return condensate tank 27, and passed by condensate pump 28 and line 29 to heat exchanger 30.

The present invention has achieved significant energy savings in the production of concentrated alcohol from fermented beer. The solution to this problem has eluded others in the industry, who have suggested instead saving the energy used to dry the slop by merely attempting to dump the slop as it comes from the beer still. With the present invention, on the other hand, a dry slop is obtained that is more convenient to handle and suffers less from disposal, storage, and transportation difficulties than slops produced by conventional processes.

It will be apparent to those skilled in the art that various modifications and variations could be made in the process and system of the invention without departing from the scope or spirit of the invention.

What is claimed is:

1. A process for producing concentrated alcohol and distillery slop from fermented beer with a reduced amount of energy comprising:
   (a) feeding said beer to a beer still;
   (b) feeding a portion of a water vapor derived from step (e) hereinbelow, to said still;
   (c) withdrawing an alcohol-rich vapor as the overhead from said still;
   (d) withdrawing an alcohol-poor distillery slop as the bottom stream from said still;
   (e) passing said slop from said still to an evaporator to concentrate said slop by evaporating water vapor therefrom;
   (f) passing said vapor from said overhead of said still to said evaporator into indirect heat exchange contact with said slop to condense a portion of said vapor and form a condensate;
   (g) passing said condensate from said evaporator to a condensate stripper and withdrawing an alcohol-rich stream as the overhead from said stripper and an alcohol-poor stream as the bottom stream from said stripper;
   (h) feeding a portion of said water vapor derived from step (e) hereinabove to said stripper;

(i) passing the uncondensed vapor from the evaporator to a rectifier to supply substantially all the sensible heat of said vapor to said rectifier and withdrawing concentrated alcohol as the overhead from said rectifier and an alcohol-containing mixture as the bottom stream from said rectifier;

(j) passing said alcohol-containing mixture from said rectifier to said stripper for admixture with said condensate from the evaporator;

(k) passing at least a portion of at least one of said water vapor from said evaporator and said vapor from said still to a compressor to form a compressed vapor, the energy supplied to said compressor constituting a primary source of energy to said process; and (l) withdrawing said concentrated slop from said evaporator.

2. A process according to claim 1, wherein said water vapor from said evaporator is passed to said compressor to form a compressed vapor, which is then passed to said beer still and said condensate stripper.

3. A process according to claim 2, further comprising passing said alcohol-rich stream from said stripper to said evaporator for admixture with said vapor from the overhead of said still.

4. A process according to claim 3, wherein said evaporator comprises a plurality of stages, the concentrated slop withdrawn from the first stage being passed to subsequent stages for further concentration.

5. A process according to claim 4, wherein said evaporator comprises three stages, the water vapor from all three stages being compressed in said compressor.

6. A method according to claim 5, wherein a portion of said compressed vapor is passed to said second stage of said evaporator into indirect heat exchange contact with said slop and outside steam is passed to said third stage into indirect heat exchange contact with said slop.

7. A process according to claim 5, further comprising passing at least one of said bottom stream from said stripper and the condensate from said second stage of said evaporator into indirect heat exchange contact with said beer upstream of said beer still to preheat said beer.

* * * * *